United States Patent
Shoemaker

[11] 4,066,339
[45] Jan. 3, 1978

[54] OPTOMETER EYEPIECE

[75] Inventor: Arthur H. Shoemaker, East Aurora, N.Y.

[73] Assignee: American Optical Corporation, Southbridge, Mass.

[21] Appl. No.: 705,856

[22] Filed: July 16, 1976

[51] Int. Cl.² .......................... G02B 3/00; G02B 9/34
[52] U.S. Cl. ........................... 350/175 E; 350/220
[58] Field of Search ........................ 350/175 E, 220

[56] References Cited
U.S. PATENT DOCUMENTS 2,637,245 5/1953 Ludewig ..................... 350/220 X
3,352,620 11/1967 Scidmore et al. ................. 350/220

Primary Examiner—Paul A. Sacher
Attorney, Agent, or Firm—H. R. Berkenstock, Jr.; Alan H. Spencer

[57] ABSTRACT

A four-component eyepiece for an optometer has an eye relief of about 117mm and is substantially free of chromatic aberration.

2 Claims, 1 Drawing Figure

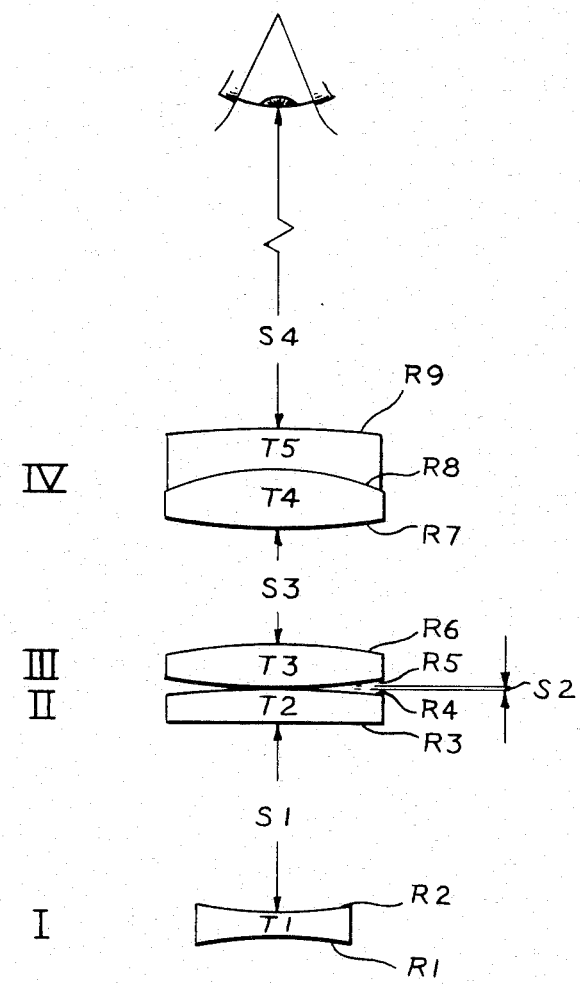

OPTOMETER EYEPIECE

BACKGROUND OF THE INVENTION

This invention relates to an eyepiece and more particularly to an optometer eyepiece having four components.

THE DRAWING

FIG. 1 is an optical diagram of an eyepiece viewed transverse to the optical axis.

DESCRIPTION OF THE INVENTION

Referring to FIG. 1, an optometer eyepiece is diagrammatically shown with optically-aligned lenses I, II, III and IV. The first component I is a biconcavo negative singlet, the second component II is a plano-convex positive singlet, the third component III is a biconvex positive singlet and the fourth component IV is a biconvex positive doublet. The eyepiece provides an imaging distance providing an eye relief of about 117mm.

The parameters of the eyepiece according to the present invention are set forth in Table I with axial thicknesses of successive lens components designated $T_1$ to $T_5$ and the successive axial spaces from the first component of the eyepiece to the observer's eye are designated $S_1$ to $S_4$. The successive lens radii are designated $R_1$ to $R_9$ with a minus sign (−) indicating surfaces whose center of curvature lies on the eye side of their vertices. Refractive indices and Abbe numbers of the glasses in the successive lenses are absolute values designated $ND_1$ to $ND_5$ and $\nu_1$ to $\nu_5$ respectively.

Table I

| Lens | Radius(R) | Thickness(T) | Spacing(S) | Index of Refraction(ND) | Abbe No.($\nu$) |
|---|---|---|---|---|---|
| I | $R_1 = +0.90598x$ | $T_1 = 0.034188x$ | | $1.58 < ND_1 < 1.60$ | $\nu_1 \approx 61$ |
| | $R_2 = -0.90598x$ | | $S_1 = 0.28222x$ | | |
| II | $R_3 = > 100x$ | $T_2 = 0.051282x$ | | $1.58 < ND_2 < 1.60$ | $\nu_2 \approx 61$ |
| | $R_4 = 1.6036x$ | | $S_2 = 0.0008547x$ | | |
| III | $R_5 = -1.5231x$ | $T_3 = 0.068376x$ | | $1.58 < ND_3 < 1.60$ | $\nu_3 \approx 61$ |
| | $R_6 = 0.89786x$ | | $S_3 = 0.17239x$ | | |
| | $R_7 = -1.8352x$ | | | | |
| IV | $R_8 = 0.42966x$ | $T_4 = 0.08547x$ | | $1.58 < ND_4 < 1.60$ | $\nu_4 \approx 61$ |
| | $R_9 = 1.1479x$ | $T_5 = 0.059829x$ | $S_4 = 0.9982x$ | $1.77 < ND_5 < 1.79$ | $\nu_5 \approx 26$ | wherein x is 115 to 119mm.

A specific embodiment of the present invention wherein x is equal to 117mm and has the following values with radii, spacings and thicknesses being in millimeters.

Table II

| Lens | Radius(R) | Thickness(T) | Spacing(S) | Index of Refraction(ND) | Abbe No.($\nu$) |
|---|---|---|---|---|---|
| I | $R_1 = 106.00$ | $T_1 = 4.0$ | | $ND_1 = 1.589$ | $\nu_1 = 61.12$ |
| | $R_2 = -106.00$ | | $S_1 = 33.02$ | | |
| II | $R_3 = \infty$ | $T_2 = 6.0$ | | $ND_2 = 1.589$ | $\nu_2 = 61.12$ |
| | $R_4 = 187.62$ | | $S_2 = 0.10$ | | |
| III | $R_5 = -178.20$ | $T_3 = 8.0$ | | $ND_3 = 1.589$ | $\nu_3 = 61.12$ |
| | $R_6 = 105.05$ | | $S_3 = 20.17$ | | |
| | $R_7 = -214.715$ | $T_4 = 10.0$ | | $ND_4 = 1.589$ | $\nu_4 = 61.12$ |
| IV | $R_8 = 50.27$ | $T_5 = 7.0$ | | $ND_5 = 1.784$ | $\nu_5 = 25.76$ |
| | $R_9 = 134.30$ | | $S_4 = 116.79$ | | |

What is claimed is:
1. A four component optometer eyepiece being substantially free of chromatic aberration comprising a biconcave negative singlet I, a plano-convex positive singlet II, a biconvex positive singlet III and a biconvex positive doublet IV all aligned in sequence along an optical axis and having the values set forth below with axial thicknesses of the successive lens components being designated $T_1$ to $T_5$, successive axial spaces from the first component to an observer's eye being designated $S_1$ to $S_4$, successive lens radii being designated $R_1$ to $R_9$ where the minus sign (−) indicates surfaces whose center of curvature lies on an observer's side of their vertices, refractive indices and Abbe numbers are absolute values designated $ND_1$ to $ND_5$ and $\nu_1$ to $\nu_5$, respectively,

| Lens | Radius(R) | Thickness (T) | Spacing(S) | Index of Refraction (ND) | Abbe No. ( ) |
|---|---|---|---|---|---|
| I | $R_1 = 0.90598x$ | $T_1 = 0.034188x$ | | $1.58 < ND_1 < 1.60$ | $\nu_1 = 61$ |
| | $R_2 = 0.90598x$ | | $S_1 = 0.28222x$ | | |
| | $R_3 = 100x$ | | | | |
| II | $R_4 = 1.6036x$ | $T_2 = 0.051282x$ | | $1.58 < ND_2 < 1.60$ | $\nu_2 = 61$ |
| | $R_5 =$ | | $S_2 = 0.0008547x$ | | |

-continued

| Lens | Radius(R) | Thickness (T) | Spacing(S) | Index of Refraction (ND) | Abbe No. ( ) |
|---|---|---|---|---|---|
| | 1.5231x | | | | |
| III | $R_6 =$ 0.89786x | $T_3 =$ 0.068376x | | $1.58 <$ $ND_3 < 1.60$ | $\nu_3 = 61$ |
| | $R_7 =$ −1.8352x | | $S_3 =$ 0.17239x | | |
| | | $T_4 =$ | | $1.58 <$ | |
| IV | $R_8 =$ 0.42966x | 0.08547x | | $ND_4 < 1.60$ | $\nu_4 = 61$ |
| | $R_9 =$ 1.1479x | $T_5 =$ 0.059829x | $S_4 =$ 0.9982x | $1.77 <$ $ND_5 < 1.79$ | $\nu_5 = 26$ | and x is 115 to 119mm.

2. The eyepiece according to claim 1 wherein $x$ is 117mm, $ND_1$ to $ND_4$ are 1.589, $ND_5$ is 1.784, $\nu_1$ to $\nu_4$ are 61.12 and $\nu_5$ is 25.76.

* * * * *